(12) United States Patent
Hong et al.

(10) Patent No.: US 12,224,946 B2
(45) Date of Patent: Feb. 11, 2025

(54) CENTRALIZED NETWORK CONFIGURATION ENTITY AND TIME-SENSITIVE NETWORK CONTROL SYSTEM COMPRISING SAME

(71) Applicant: INDUSTRY-UNIVERSITY COOPERATION FOUNDATION HANYANG UNIVERSITY ERICA CAMPUS, Ansan-si (KR)

(72) Inventors: Seung Ho Hong, Seoul (KR); Yuting Li, Ansan-si (KR)

(73) Assignee: INDUSTRY-UNIVERSITY COOPERATION FOUNDATION HANYANG UNIVERSITY ERICA CAMPUS, Ansan (KR)

( * ) Notice: Subject to any disclaimer, the term of this patent is extended or adjusted under 35 U.S.C. 154(b) by 19 days.

(21) Appl. No.: 17/768,512

(22) PCT Filed: Jul. 15, 2020

(86) PCT No.: PCT/KR2020/009308
§ 371 (c)(1),
(2) Date: Apr. 13, 2022

(87) PCT Pub. No.: WO2021/075671
PCT Pub. Date: Apr. 22, 2021

(65) Prior Publication Data
US 2024/0098033 A1   Mar. 21, 2024

(30) Foreign Application Priority Data
Oct. 15, 2019 (KR) .................. 10-2019-0127845

(51) Int. Cl.
*H04L 47/283* (2022.01)
*H04L 47/70* (2022.01)

(52) U.S. Cl.
CPC .......... *H04L 47/283* (2013.01); *H04L 47/826* (2013.01)

(58) Field of Classification Search
CPC ........................... H04L 47/283; H04L 47/826
See application file for complete search history.

(56) References Cited

U.S. PATENT DOCUMENTS

| 6,949,290 B2 | 9/2005 | Schaeffeler et al. |
| 7,200,768 B2 | 4/2007 | Andersson et al. |
| 8,213,452 B2 | 7/2012 | Hou |

(Continued)

FOREIGN PATENT DOCUMENTS

| CN | 107078958 A | 8/2017 |
| CN | 108809852 A | 11/2018 |

(Continued)

OTHER PUBLICATIONS

International Search Report (English and Korean) and Written Opinion of the ISA (Korean) issued in PCT/KR2020/009308, mailed Oct. 15, 2020; ISA/KR.

(Continued)

*Primary Examiner* — Duc C Ho
(74) *Attorney, Agent, or Firm* — Harness, Dickey & Pierce, P.L.C.

(57) ABSTRACT

A time-sensitive network control system and a centralized network configuration entity for controlling data traffic in the time-sensitive network control system.

16 Claims, 15 Drawing Sheets

(56) References Cited

U.S. PATENT DOCUMENTS

| | | |
|---|---|---|
| 9,025,585 B2 | 5/2015 | Hong et al. |
| 2005/0226156 A1 | 10/2005 | Keating et al. |
| 2008/0019397 A1 | 1/2008 | Hou |
| 2012/0320881 A1 | 12/2012 | Hong et al. |
| 2016/0127250 A1 | 5/2016 | McCormick et al. |
| 2018/0006956 A1 | 1/2018 | Bush et al. |
| 2018/0063020 A1* | 3/2018 | Bhagavatula ........... H04L 47/80 |
| 2018/0237039 A1 | 8/2018 | Mong et al. |
| 2019/0253339 A1 | 8/2019 | Mehmedagic |
| 2020/0028791 A1* | 1/2020 | McGrath ............... H04L 41/145 |
| 2020/0259755 A1 | 8/2020 | Wang et al. |
| 2020/0259896 A1* | 8/2020 | Sachs .................... H04W 12/04 |

FOREIGN PATENT DOCUMENTS

| | | |
|---|---|---|
| CN | 109691038 A | 4/2019 |
| EP | 3691199 A1 | 8/2020 |
| KR | 100270685 B1 | 11/2000 |
| KR | 1020050025334 A | 3/2005 |
| KR | 1020080008284 A | 1/2008 |
| KR | 1020120139945 A | 12/2012 |
| WO | 2019084970 A1 | 5/2019 |

OTHER PUBLICATIONS

Ahmed Nasrallah, et al., "Ultra-Law Latency (ULL) Networks: The IEEE TSN and IETF DetNet Standards and Related 5G ULL Research" arxiv.org, Cornell University Library, 201 Olin Library Cornell University Ithaca, NY 14853, Mar. 20, 2018 (Mar. 20, 2018), XP081196057, DOI:10.1109/COMST.2018.2869350, p. 18-p. 20.

Extended European Search Report for Application No. 20877207.9 dated May 19, 2023 (12 page).

* cited by examiner

*FIG. 12*

| gate Operation Name | gate States | time Interval (us) |
|---|---|---|
| Operation 0 | 1100 0000 | 12.24 |
| Operation 1 | 0011 1111 | 75.52 |
| Operation 2 | 0000 0000 | 12.24 |
| Operation 3 | 1100 0000 | 12.24 |
| Operation 4 | 0011 1111 | 75.52 |
| Operation 5 | 0000 0000 | 12.24 |
| Operation 6 | 1100 0000 | 12.24 |
| Operation 7 | 0011 1111 | 75.52 |
| Operation 8 | 0000 0000 | 12.24 |
| Operation 9 | 1100 0000 | 12.24 |
| Operation 10 | 0011 1111 | 75.52 |
| Operation 11 | 0000 0000 | 12.24 |
| Operation 12 | 1100 0000 | 12.24 |
| Operation 13 | 0011 1111 | 75.52 |
| Operation 14 | 0000 0000 | 12.24 |
| Operation 15 | 1100 0000 | 12.24 |
| Operation 16 | 0011 1111 | 75.52 |
| Operation 17 | 0000 0000 | 12.24 |
| Operation 18 | 1100 0000 | 12.24 |
| Operation 19 | 0011 1111 | 75.52 |
| Operation 20 | 0000 0000 | 12.24 |
| Operation 21 | 1100 0000 | 12.24 |
| Operation 22 | 0011 1111 | 75.52 |
| Operation 23 | 0000 0000 | 12.24 |

FIG. 13

| gate Operation Name | gate States | time Interval (us) |
|---|---|---|
| Operation 0 | 0011 1111 | 8.5 |
| Operation 1 | 0000 0000 | 12.24 |
| Operation 2 | 1100 0000 | 49.344 |
| Operation 3 | 0011 1111 | 38.416 |
| Operation 4 | 0000 0000 | 12.24 |
| Operation 5 | 1100 0000 | 49.344 |
| Operation 6 | 0011 1111 | 38.416 |
| Operation 7 | 0000 0000 | 12.24 |
| Operation 8 | 1100 0000 | 49.344 |
| Operation 9 | 0011 1111 | 38.416 |
| Operation 10 | 0000 0000 | 12.24 |
| Operation 11 | 1100 0000 | 49.344 |
| Operation 12 | 0011 1111 | 38.416 |
| Operation 13 | 0000 0000 | 12.24 |
| Operation 14 | 1100 0000 | 49.344 |
| Operation 15 | 0011 1111 | 38.416 |
| Operation 16 | 0000 0000 | 12.24 |
| Operation 17 | 1100 0000 | 49.344 |
| Operation 18 | 0011 1111 | 38.416 |
| Operation 19 | 0000 0000 | 12.24 |
| Operation 20 | 1100 0000 | 49.344 |
| Operation 21 | 0011 1111 | 38.416 |
| Operation 22 | 0000 0000 | 12.24 |
| Operation 23 | 1100 0000 | 49.344 |
| Operation 24 | 0011 1111 | 29.916 |

*FIG.15*

| gate Operation Name | gate States | time Interval (us) |
|---|---|---|
| Operation 0 | 0011 1111 | 70.72 |
| Operation 1 | 0000 0000 | 12.24 |
| Operation 2 | 1100 0000 | 86.352 |
| Operation 3 | 0011 1111 | 101.408 |
| Operation 4 | 0000 0000 | 12.24 |
| Operation 5 | 1100 0000 | 86.352 |
| Operation 6 | 0011 1111 | 101.408 |
| Operation 7 | 0000 0000 | 12.24 |
| Operation 8 | 1100 0000 | 86.352 |
| Operation 9 | 0011 1111 | 101.408 |
| Operation 10 | 0000 0000 | 12.24 |
| Operation 11 | 1100 0000 | 86.352 |
| Operation 12 | 0011 1111 | 30.688 |

CENTRALIZED NETWORK CONFIGURATION ENTITY AND TIME-SENSITIVE NETWORK CONTROL SYSTEM COMPRISING SAME

CROSS-REFERENCE TO RELATED APPLICATIONS

This application is a U.S. National Phase Application under 35 U.S.C. 371 of International Application No. PCT/KR2020/009308, filed on Jul. 15, 2020, which claims the benefit of Korean Patent Application No. 10-2019-0127845, filed on Oct. 15, 2019. The entire disclosures of the above applications are incorporated herein by reference in their entirety.

TECHNICAL FIELD

The present embodiments relate to a time sensitive network control system and a central network configurator controlling data traffic in the time sensitive network control system.

BACKGROUND ART

Ultra-low latency infrastructure technology is a technology for real-time time-sensitive communication and industrial process control measurement information exchange, beyond limitations on the Internet and general-purpose communication networks that have been created for the purpose of exchanging multimedia information and contributed to increase bandwidth.

As there is a consensus on the need for ultra-low latency technology to support industrial convergence services and 5G services, the importance of ultra-low latency network technology in wireless/wired infrastructure is growing.

In particular, in the time-sensitive network that processes data that is very sensitive to time delay among ultra-low latency network technologies, the delay from generation of data to the time when a reception entity receiving it receives data is extremely limited. Therefore, to meet the required delay, optimization is required in network configuration, data transfer path, data forwarding and queuing technology, and stream resource allocation and management technology.

However, in the conventional network system, there is not disclosed a control technique for allowing time-sensitive data to arrive to the reception entity within the required delay in an environment in which time-insensitive data, which is not sensitive to time, and time-sensitive data coexist. In other words, the conventional network system fails to meet the required delay in a context where data traffic is controlled in an environment where only time-sensitive data is configured or time-sensitive data and time-insensitive data are mixed.

DETAILED DESCRIPTION OF THE INVENTION

Technical Problem

The present embodiments may provide data traffic control technology capable of meeting the required delay even in a network system where time-sensitive data and time-insensitive data are mixed.

The present embodiments also provide technology capable of minimizing the computing time for data traffic control.

Technical Solution

In an aspect, the present embodiments may provide a central network configurator controlling data traffic scheduling of a time-sensitive network, comprising a receiver receiving, from a central user configurator, stream information about a plurality of traffic flows transmitting first data sensitive to time delay in a sub network and second data insensitive to the time delay, a resource allocator allocating an output port time resource of each switch entity included in the sub network transferring the first data and the second data using the stream information, a gate control list generator generating at least one of switch gate control list information for controlling an operation of the switch entity and transmission entity gate control list information for controlling a data transmission gate of a plurality of transmission entities transmitting the plurality of traffic flows, based on the stream information and the output port time resource, and a transmitter transmitting the switch gate control list information to the switch and transmitting the transmission entity gate control list information to the central user configurator.

In another aspect, the present embodiments may provide a time-sensitive network control system, comprising a plurality of transmission entities generating and transmitting first data sensitive to time delay and second data insensitive to the time delay, a plurality of reception entities receiving the first data and the second data, a plurality of switch entities in one or more sub networks for transferring the first data and the second data to the reception entity, a central user configurator receiving stream information about a plurality of traffic flows from the transmission entity and the reception entity, transferring the stream information to a central network configurator, and transferring transmission entity gate control list information to the transmission entity, and the central network configurator allocating an output port time resource of a switch entity in each sub network based on the stream information and generating at least one of switch gate control list information for controlling an operation of the switch entity and transmission entity gate control list information for controlling a data transmission gate of the transmission entity transmitting the plurality of traffic flows.

Advantageous Effects

According to the present embodiments, it is possible to provide data traffic control technology capable of meeting the required delay even in a network system where time-sensitive data and time-insensitive data are mixed.

According to the present embodiments, it is possible to minimize the computing time for data traffic control.

BRIEF DESCRIPTION OF DRAWINGS

FIG. 12 is a view illustrating an example of transmission entity gate control list information according to an embodiment;

FIG. 13 is a view illustrating an example of switch gate control list information according to an embodiment;

FIG. 15 is a view illustrating an example of switch gate control list information in switch entity 4 according to an embodiment.

MODE FOR CARRYING OUT THE INVENTION

Figure 1:
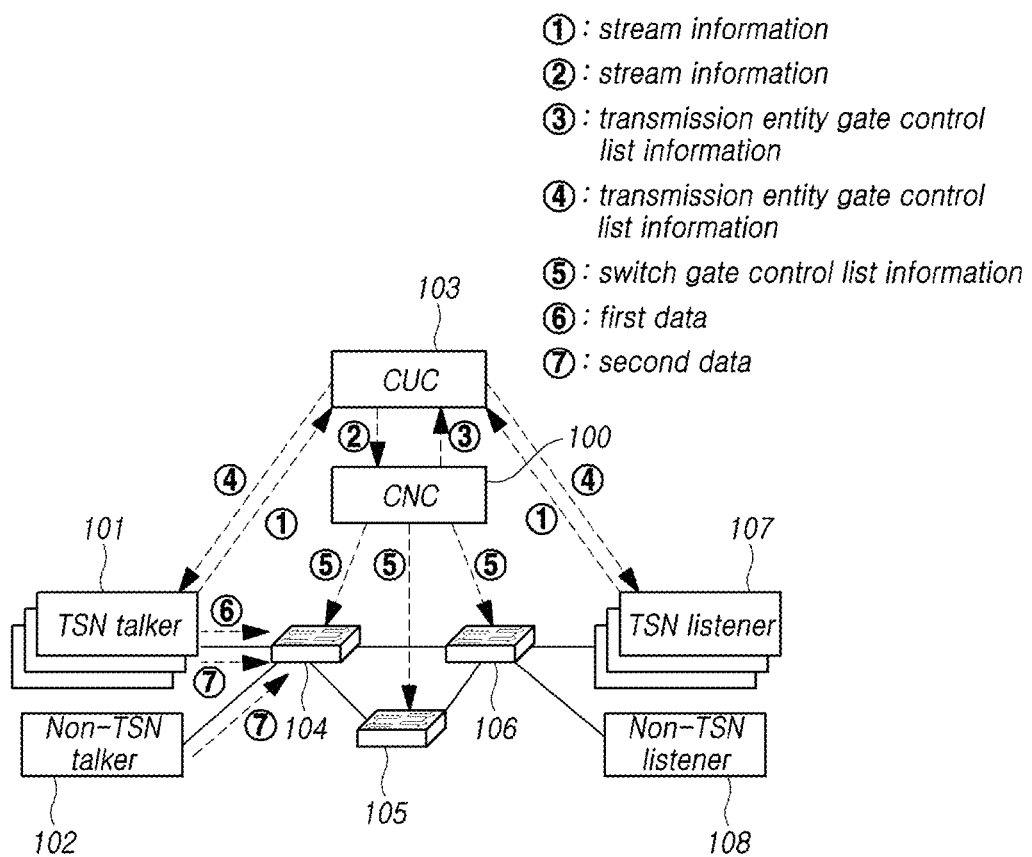
FIG. 1 is a view conceptually illustrating an overall configuration of a time-sensitive network control system according to an embodiment.

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

In the disclosure, the description is made under the assumption that the time-sensitive network control system divides and assigns data transmissions by time division. This is for convenience, and the data traffic control operation according to time division resource allocation according to the present embodiments in each bandwidth may be applied even where a plurality of divided bandwidths are used.

Further, in the present embodiments, the name of each entity in the system is arbitrarily selected for convenience of description, and the name is not limited thereto, and the terms for data, format, interval, and information are not limited to those terms described below.

The present embodiments relate to data traffic control technology that meets the required delay of time-sensitive data in a network where time-sensitive data and time-insensitive data are mixed and processed.

Conventional data traffic control technology mainly uses satisfiability modulo theories (SMT) solver. However, the SMT solver-based traffic control technology is limited in actual use in the TSN network by the computing time that exponentially increases or the data traffic control command in excess of the maximum command length.

As derived to address the problems, the disclosure reduces the computing time by up to 80% as compared with the conventional traffic control algorithm. Further, the disclosure adopts a new scheme of bandwidth allocation system to eliminate computation load, unlike conventional SMT-based, ILP-based, and heuristic-based approaches. Accordingly, the disclosure may sufficiently meet the required delay of time-sensitive data in a context where time-sensitive data and time-insensitive data coexist.

FIG. 1 is a view conceptually illustrating an overall configuration of a time-sensitive network control system according to an embodiment.

Referring to FIG. 1, a time-sensitive network control system may include a plurality of transmission entities 101 and 102 that generate and transmit first data sensitive to time delay and second data insensitive to time delay, a plurality of reception entities 107 and 108 that receive the first data and the second data, a plurality of switch entities 104, 105, and 106 for transferring the first data and the second data to the reception entities, a central user configurator 103 that receives stream information from the transmission entities and the reception entities, transfers the stream information to a central network configurator, and transfers transmission entity gate control list information to the transmission entities, and a central network configurator 100 that assigns an output port time resource of the switch entity based on the stream information and generates switch gate control list information for controlling the operation of the switch entity and transmission entity gate control list information for controlling the data transmission gate of the plurality of transmission entities.

In description of the disclosure, for convenience of description, the transmission entity 101 transmitting time delay-sensitive data may be specified as a time-sensitive network (TSN) talker, and the transmission entity 102 transmitting time delay-insensitive data may be specified as a non-TSN talker. Likewise, the reception entity 107 receiving time delay-sensitive data may be specified as a TSN listener, and the transmission entity 108 transmitting time delay-insensitive data may be specified as a non-TSN listener.

Here, the plurality of transmission entities 101 and 102, respectively, may transmit the first data sensitive to time delay and the second data insensitive to time delay. Or, among the plurality of transmission entities 101 and 102, the transmission entity 101 transmitting the first data sensitive to time delay and the transmission entity 102 transmitting the second data insensitive to time delay may be physically separated from each other. Likewise, the plurality of reception entities 107 and 108, respectively, may receive the first data sensitive to time delay and the second data insensitive to time delay. Or, among the plurality of reception entities 107 and 108, the reception entity 107 receiving the first data sensitive to time delay and the reception entity 108 receiving the second data insensitive to time delay may be physically separated from each other.

The first data and the second data may be transferred from the transmission entities 101 and 102 to the reception entities 107 and 108 through one or more switch entities 104, 105, and 106 constituting a network. The switch entities 104, 105, and 106 may be configured to include a queue to transfer data and may include an output port for transferring data between the switch entities 104, 105, and 106.

The central user configurator (CUC) 103 may receive stream information about the traffic flow from the transmission entity 101 and the reception entity 107 and transmit transmission entity gate control list information for controlling the gate of each entity to the transmission entity 101 and the reception entity 107.

The central network configurator (CNC) 100 may perform the function of controlling a data traffic flow of the time-sensitive network control system. For example, the central network configurator 100 may produce information for controlling the operation of the transmission entities 101 and 102 and the gate for data traffic processing for the first data and second data transmitted by the plurality of transmission entities 101 and 102 to meet the required delay of the first data. Hereinafter, a specific operation of the central network configurator 100 is described in detail with reference to the drawings.

Meanwhile, the time-sensitive network may be configured of a set of one or more sub networks. For example, as transferred from the transmission entities 101 and 102 to the reception entities 107 and 108, the data may be transferred via one or more sub networks including two or more switch entities. In description of the disclosure, data traffic transferred in view of each sub network or the transmission entity transferring data traffic or the switch entity of the previous sub network is specified as a traffic flow.

The traffic flow may be understood as a single flow from the transmission entities 101 and 102 to the reception entities 107 and 108. Accordingly, in the time-sensitive network, there may be multiple traffic flows and multiple transmission entities generating multiple traffic flows. In the case of a first sub network in which the transmission entities 101 and 102 immediately receive data and transfer to the next sub network, the traffic flow may mean the transmission entity.

Accordingly, the traffic flow described below may be understood as meaning the transmission entity in the time-sensitive network constituted of a single sub network.

The operation for controlling data traffic in the time-sensitive network control system is described.

First, the central user configurator 103 receives stream information about the traffic flow from the transmission entity 101 and the reception entity 107. For example, the stream information may include information about the number of the plurality of traffic flows, maximum allowable delay information about the first data per traffic flow, and data frame length information about the first data. The central user configurator 103 transfers the gathered stream information to the central network configurator 100.

The central network configurator 100 assigns the output port time resource of the switch entities 104, 105, and 106 included in a specific sub network using the received stream information. Further, the central network configurator 100 generates at least one of switch gate control list information for controlling the operation of the switch entities 104, 105, and 106 and transmission entity gate control list information for controlling the data transmission gate of the plurality of transmission entities 101. A specific algorithm for assigning time resource and generating gate control list information by the central network configurator 100 is described below in detail.

The central network configurator 100 transmits the generated transmission entity gate control list information to the central user configurator 103. The central user configurator 103 transmits the transmission entity gate control list information to at least one of the transmission entity 101 and the reception entity 107. The central network configurator 100 transfers the generated switch gate control list information to each of the switch entities 104, 105, and 106.

The transmission entity 101 controls a queue gate operation for transmission of the first data and/or second data according to the gate operation information of the received transmission entity gate control list information. Similarly, the switch entities 104, 105, and 106 controls the gate operation of the output port of the switch entity based on the received switch gate control list information and transfers the first data and the second data.

As such, the central network configurator 100 generates gate control list information for controlling the gate operation of each configurator constituting the network using the stream information and controls the overall data traffic of the system. In particular, the central network configurator 100 may optimize the data flow of the time-sensitive network by controlling the gate operation of each configurator so that data reaches the reception entity within the required delay of time-sensitive data.

Figure 2:
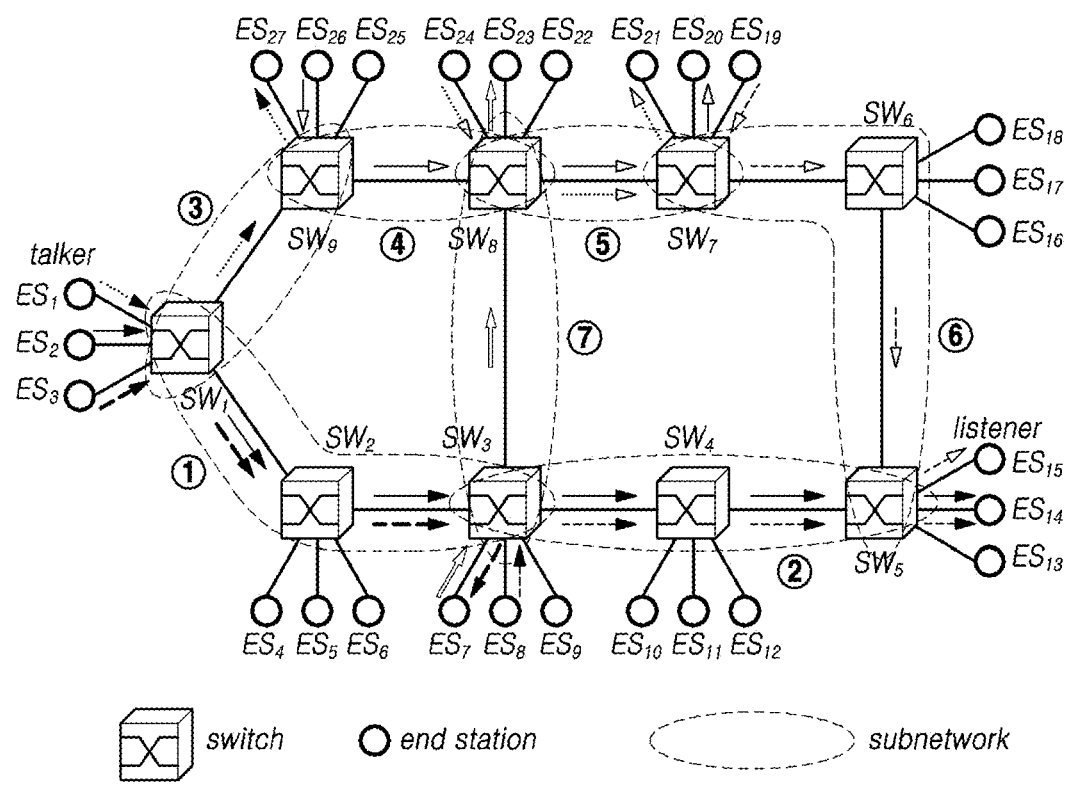
FIG. 2 is a view illustrating a time-sensitive network including two or more sub networks according to an embodiment.

FIG. 2 is a view illustrating a time-sensitive network including two or more sub networks according to an embodiment.

Referring to FIG. 2, the time-sensitive network may include multiple end stations. Each end station may be a transmission entity or a reception entity. Or, each end station may be a transmission entity or a reception entity depending on data transmission/reception.

The time-sensitive network may include multiple switch entities SW. Each switch entity may be connected with the transmission entity and/or the reception entity.

Each transmission entity may transmit first data or second data to the reception entity. The first data and the second data may be transferred through various paths, and in the disclosure, the path where the first data and second data are transferred is not limited. For example, a transfer path for the first data and second data may be determined based on a well-known stream reservation protocol. Further, various protocols for determining the data transfer path may be configured, and the disclosure is not limited.

As shown in FIG. 2, some transmission entities may transmit the first data or second data to the reception entity. For example, the transmission entity $ES_2$ transmits data to the reception entity $ES_{14}$. In this case, the data transmission path is determined by the above-described transmission path protocol.

Meanwhile, the time-sensitive network may be divided into a plurality of sub networks. For example, the sub network may be separated as a serial set of branchless switches. As shown in FIG. 2, the time-sensitive network may be divided into seven sub networks depending on whether each switch has a branch. In this case, the data transmitted from $ES_2$ may be transferred to the reception entity through sub networks 1 and 2.

The maximum allowable delay when the data transmitted from $ES_2$ is the first data may be determined as the sum of the maximum allowable delays for the traffic flows in the sub networks.

Therefore, the central network configurator according to the disclosure needs to control the operation of the switch entity in the sub network for each data, within a range meeting the maximum allowable delay per traffic flow.

Figure 3:
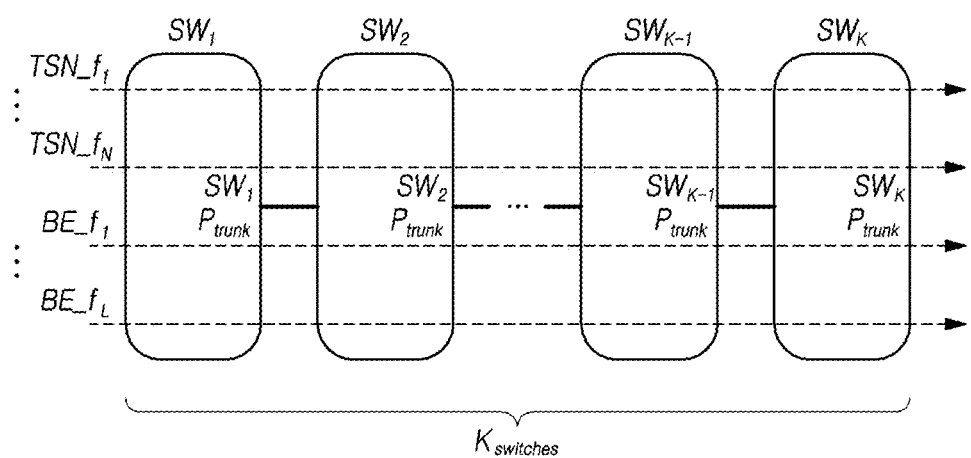
FIG. 3 is a view conceptually illustrating a data transfer flow in which a traffic flow in a sub network is transmitted through a plurality of switches according to an embodiment.

FIG. 3 is a view conceptually illustrating a data transfer flow in which a traffic flow in a sub network is transmitted through a plurality of switches according to an embodiment.

Referring to FIG. 3, in a case where K switch entities are configured in a sub network, there are N traffic flows $TSN\_f_N$ including first data. Further, there are L traffic flows $BE\_f_L$ including second data. The first data and second data are transferred through the K switch entities configured in each sub network, and each switch entity may transfer data to the next switch entity through the output port.

However, the first data in the time-sensitive network is delay-sensitive data and should be received by the reception entity within the maximum allowable delay after transmitted by the transmission entity. For the maximum allowable delay per traffic flow from the transmission entity to the reception entity, the number of sub networks and the total number of switch entities may be varied depending on what path it is transferred through. Accordingly, the sum of the maximum allowable delays per traffic flow in each sub network may be set to be equal to or smaller than the maximum allowable delay of the traffic flow transferred by the transmission entity to the reception entity. Therefore, each sub network should transfer data within the maximum allowable delay allocated to the corresponding sub network. To that end, data transmission in the switch entity in each sub network, data transmission time in the transmission entity, and time resource allocation are very critical.

For example, a specific switch entity in the sub network transfers the first data and the second data, received separately through a plurality of traffic flows, to another switch entity. In this case, the first data and the second data are transferred through the output port of each switch entity to the input port of the next switch entity. Accordingly, it is required to dynamically configure a format for data transfer and gate control operation in the output port of the switch entity and control the first data to be processed within the required delay.

Further, if each switch entity operation in each sub network per traffic flow and the format for data transfer are determined, the plurality of transmission entities which generate and transmit each traffic flow may also dynamically control the times of transmission of the first data and/or the second data considering the gate operation of the switch entity.

By so doing, in the system where the first data and the second data coexist, there is provided a traffic control technique that meets the required delay for the first data.

Figure 4:
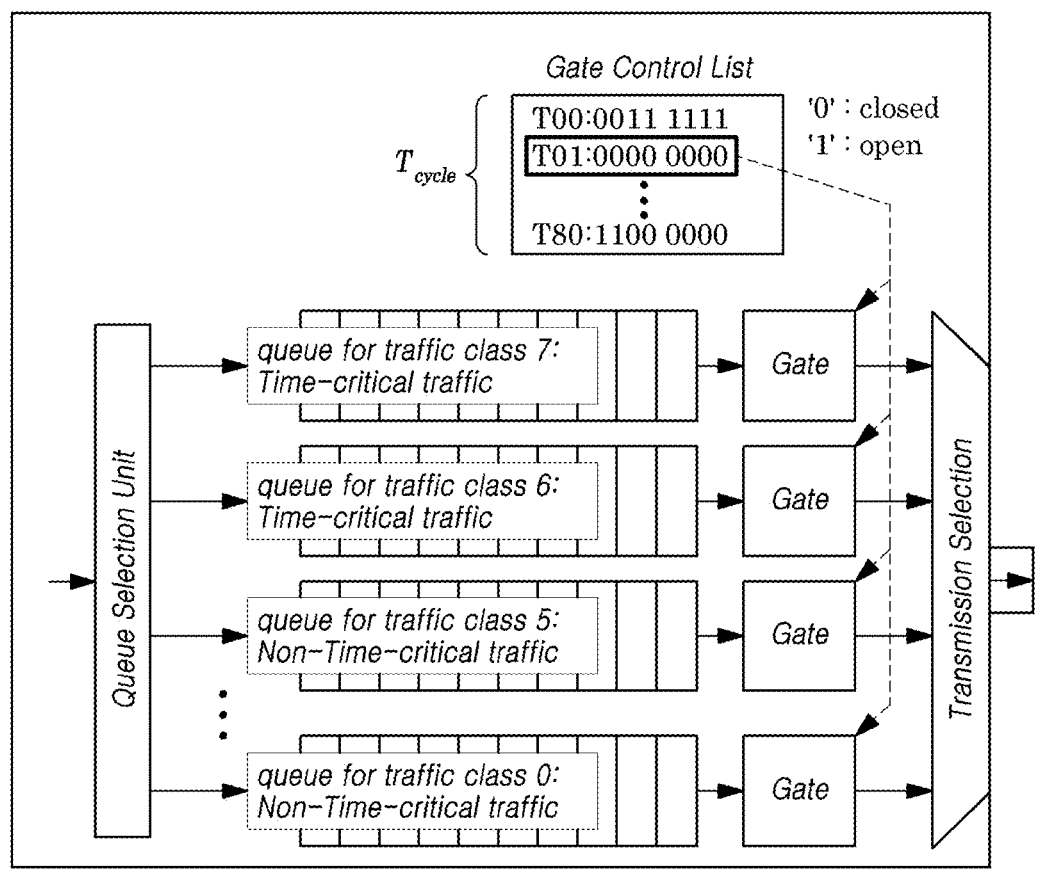
FIG. 4 is a view illustrating gate control operations of a transmission entity and a switch entity according to an embodiment.

FIG. 4 is a view illustrating gate control operations of a transmission entity and a switch entity according to an embodiment.

Referring to FIG. 4, the transmission entity or switch entity in the sub network directly connected with the transmission entity to receive traffic flow may divide data into first data, which is time-sensitive traffic, and second data, which is time-insensitive traffic, and select a queue for each data transmission. However, this is exemplary, and FIG. 4 is likewise applicable to the gate included in each sub network. In this case, the same may be likewise applied to the transmission entity by changing into traffic flow.

First, the transmission entity is assumed and described. When the transmission entity is configured with eight queues, a gate operation for controlling data transmission of each queue is needed. For example, in the six queues from 0 to 5, time-insensitive traffic may be classified and stored, and sequentially transmitted and, in the two queues 6 and 7, time-sensitive traffic may be classified and stored and sequentially transmitted.

As described above, the transmission entity controls the gate of each queue to open/close according to the gate control list information generated by the central network configurator, transmitting data to the switch entity. At this time, the gate control list information may be dynamically configured by the central network configurator according to the gate control list information of the switch entity and the configuration of the time division scheduling unit format, and stream information.

Similarly, when the switch entity is configured with eight queues, a gate operation for controlling data transmission of each queue is needed. For example, in the six queues from 0 to 5, time-insensitive traffic may be classified and stored, and sequentially transmitted and, in the two queues 6 and 7, time-sensitive traffic may be classified and stored and sequentially transmitted. At this time, the output port of the switch entity may transmit each data to another switch entity by time division operation according to gate control.

The gate operation of the transmission entity and switch entity may be so controlled to control transmission of the first data and the second data. In particular, the first data should be transferred to the reception entity within the maximum allowable delay even in the context where transmissions of the first data and the second data coexist. To meet such requirement, the central network configurator may determine the gate open/close timing and duration of the transmission entity using the stream information about the traffic flow of each transmission entity and reception entity and determines the time division scheduling unit format.

Further, in the case of the switch entity, the central network configurator may determine the gate open/close timing and duration of each switch entity for the traffic flow and determine the time division scheduling unit format.

A specific operation for generating gate control list information for controlling the traffic of first data and second data by the central network configurator is described below in detail with reference to the drawings.

Figure 5:
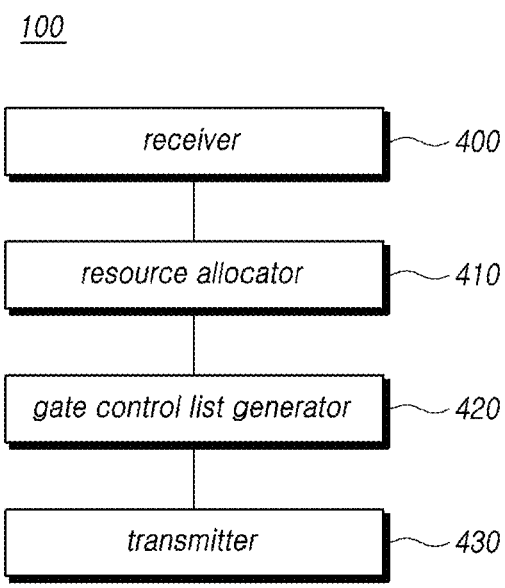
FIG. 5 is a view illustrating a configuration of a central network configurator according to an embodiment.

FIG. 5 is a view illustrating a configuration of a central network configurator according to an embodiment.

Referring to FIG. 5, the central network configurator 100 controlling data traffic scheduling of time-sensitive network may include a receiver 400 that receives, from the central user configurator, stream information about a plurality of traffic flows transmitting first data sensitive to time delay and second data insensitive to time delay in each sub network.

For example, the stream information may include information about the number of the plurality of traffic flows, maximum allowable delay information about the first data per traffic flow, and data frame length information about the first data. For example, the maximum allowable delay information about the first data per traffic flow may be maximum allowable delay information about the corresponding traffic flow in the sub network to perform gate control by the central network configurator 100. Or, the maximum allowable delay information may be maximum allowable delay information about the entire path from the transmission entity to the reception entity. Thus, the central network configurator 100 identifies the number of traffic flows transmitting the first data in the time-sensitive network (corresponding sub network), maximum allowable delay information about the first data per traffic flow, and data frame length of the data transmitted in each traffic flow.

Accordingly, the central network configurator 100 may control data traffic so that each traffic flow is transferred within the maximum allowable delay allocated in the corresponding sub network.

As necessary, the central network configurator 100 may further consider information for the number of switches configured in the sub network. The information about the number of switches configured in the sub network may be previously matched with each sub network index information and stored in the central network configurator 100.

Meanwhile, the central network configurator 100 may include a resource allocator 410 that allocates the output port time resource of each switch entity in the corresponding sub network transferring the first data and second data using the stream information.

For example, the resource allocator 410 may determine the time division scheduling unit format used for the switch entity to transfer the first data and second data to another switch entity. In other words, the resource allocator 410 may configure data transmitted from the output port of the switch entity, in a specific time division scheduling unit format. The time division scheduling unit may mean the minimum unit of output port scheduling of the switch entity.

As an example, the time division scheduling unit format may include a sensitive data transmission section for transmitting the first data, a first insensitive data transmission section for transmitting the second data, a second insensitive data transmission section, and a guard band section. For example, the guard band section may play a role to prevent the time insensitive data from disturbing the time sensitive data transmission when the time-sensitive data and the time-insensitive data are transmitted.

Figure 6:
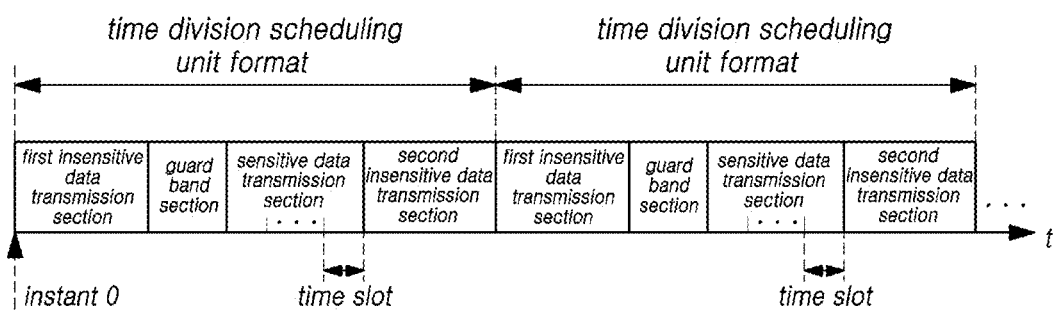
FIG. 6 is a view illustrating a configuration of a time division scheduling unit format according to an embodiment.

FIG. 6 is a view illustrating a configuration of a time division scheduling unit format according to an embodiment.

Referring to FIG. 6, the time division scheduling unit format may be repeated in a transmission cycle. The time division scheduling unit format may include an insensitive data transmission section for transmitting the second data, a sensitive data transmission section for transmitting the first data, and a guard band section. Here, the insensitive data transmission section may be divided into two. In other words, one time division scheduling unit format may include a first insensitive data transmission section, a guard band section, a sensitive data transmission section, and a second insensitive data transmission section. Further, the sensitive data transmission section may include N time slots.

Referring back to FIG. 5, the resource allocator 410 sets the length of the time division scheduling unit format and the length of each section of the time division scheduling unit format, using the stream information. Thus, the resource allocator 410 controls the first data to be processed within the allowable delay.

As an example, the length of the time division scheduling unit format is set to not more than the smallest value of the maximum allowable delay information about the first data per traffic flow included in the stream information. As described above, the maximum allowable delay information may mean the maximum allowable delay in the corresponding sub network for the first data. In other words, the stream information includes the maximum allowable delay information about the first data of each traffic flow. If there are N traffic flows in the corresponding sub network, there are N pieces of maximum allowable delay information. The resource allocator 410 configures the length of the time division scheduling unit format to be equal to or smaller than the maximum allowable delay information having the smallest value of the N pieces of maximum allowable delay information. In other words, as shown in Equation 1 below, the length of the time division scheduling unit format TDI may not exceed the smallest value of the maximum allowable delay information about all the traffic flows in the corresponding sub network.

$$\varphi_{min} = \min \{\varphi_i, \forall\, i = 1, \ldots, N\} \quad \text{[Equation 1]}$$

$$TDI^k \leq \varphi_{min}$$

$\phi_i$ is the maximum allowable delay value of traffic flow i, and $TDI^k$ denotes the length of the time division scheduling unit format of switch entity k.

Thus, it is possible to meet the delay requirements of all real-time services.

Meanwhile, the resource allocator 410 may determine the lengths for the above-described individual sections included in the time division scheduling unit format.

As an example, the sum of the first insensitive data transmission section and the guard band section may be set to be equal to the physical layer delay value from generation of first data by the transmission entity to arrival of the first data at the queue of the output port of the controlled switch in the sub network. In other words, the physical layer delay value may be determined given that the corresponding data is transferred through another sub network.

For example, $D_{phy}^{talker\_SW_k}$, which is the physical layer delay value until the data from the transmission entity arrives at the queue of the output port of the switch, may be represented as in Equation 2 below.

$$D_{phy}^{talker\_SW_k} = D_{phy}^{pre\_subnets} + \sum_{j=1}^{k}(d_{trans} + d_{prop} + d_{proc}) \quad \text{[Equation 2]}$$

Here, $D_{phy}^{pre\_subnets}$ means the sum of the physical layer delays in the previous sub network on the transfer path of the corresponding data. $d_{trans}$ means the frame transmission delay value in the physical link, $d_{prop}$ means the propagation delay value in the physical link, and $d_{proc}$ means the processing delay value in the switch.

Thus, $D_{phy}^{pre\text{-}subnets}$ may be determined as in Equation 3 below.

$$D_{phy}^{pre\_subnets} = \sum_{j=1}^{num\_sw}(d_{trans} + d_{prop} + d_{proc}) \quad \text{[Equation 3]}$$

In other words, it is determined in association with the number of switch entities constituting the previous sub network.

Therefore, when the length of the first insensitive data transmission section constituting the time division scheduling unit format of the switch entity k is $NTCI_1^k$ and the length of the guard band section is $GBI^k$, the sum of the lengths of the two sections is set as in Equation 4 below.

$$NTCI_1^k + GBI^k = D_{phy}^{talker\_SW_k} \quad \text{[Equation 4]}$$

Meanwhile, the length of the guard band section may be set to a value obtained by dividing the data frame length of the first data included in the stream information by the network link speed.

As an example, when the length of the guard band section constituting the time division scheduling unit format of the switch entity k is $GBI^k$, the length of the guard band section may be set as in Equation 5 below.

$$GBI^k = L_{mtu}/NL_{spd} \quad (5)$$

Here, $L_{mtu}$ means the data frame length of the first data, and $NL_{spd}$ means the speed value of the network link.

Accordingly, the length $NTCI_1^k$ of the first insensitive data transmission section constituting the time division scheduling unit format of switch entity k is set as in Equation 6 below.

$$NTCI_1^k = D_{phy}^{talker\_SW_k} - L_{mtu}/NL_{spd} \quad \text{[Equation 6]}$$

As such, the resource allocator 410 may set the lengths of the time division scheduling unit format and each section using the stream information.

Meanwhile, the sensitive data transmission section is constituted of a plurality of time slots. The resource allocator 410 should determine the number of time slots and the time slot allocation interval per transmission entity. The length of each time slot should be long enough for the transmission of the first data frame to be complete. Further, in determining the length of the time slot, the inter-frame gap should be considered as well.

Accordingly, the length of the time slot may be set to the value obtained by dividing the sum of the inter-frame gap and the data frame length of the first data included in the stream information by the network link speed information.

For example, the length of the time slot may be determined as in Equation 7.

$$TS = (L_{mtu} + L_{ifg})/NL_{spd} \quad (7)$$

Here, TS means the length of the time slot, $L_{mtu}$ means the data frame length (in bytes) of the first data, and $NL_{spd}$ means the speed value (in bps) of the network link. $L_{ifg}$ means the inter-frame gap (in bytes).

Meanwhile, the resource allocator 410 determines the time slot allocation interval per traffic flow. For example, the resource allocator 410 should properly allocate the time slot to each traffic flow to avoid non-deterministic queuing in the switch entity for each traffic flow.

To that end, the resource allocator 410 determines the minimum time slot allocation interval. The minimum time slot allocation interval is set to be equal to the smallest value of the maximum allowable delay information about the first data per traffic flow included in the stream information. In other words, the minimum time slot allocation interval is set every time division scheduling unit format interval. This is to process even the most time-sensitive data as slots are allocated to all time division unit formats.

The resource allocator 410 may set the time slot allocation interval for the remaining traffic flows with respect to the minimum time slot allocation interval. As an example, the resource allocator 410 may allocate the time slot per traffic flow using "windows scheduling algorithm (WSA)" which is a known algorithm. The ratio of the time slot allocation interval for each traffic flow may be calculated as in Equation 8 below.

$$TSAI_i = k_i \times TSAI_1, k_i = 2^{\lfloor \log_2(\phi_i/TSAI_1) \rfloor} \quad (8)$$

Here, $TSAI_i$ means the time slot allocation interval of the ith traffic flow, and $TSAI_1$ means the minimum time slot allocation interval set to be equal to the smallest value among the maximum allowable delay information about the first data. $k_i$ denotes the ratio of $TSAI_i$ to $TSAI_1$. From 1 to i, they are sorted in ascending order of time slot allocation interval.

Further, to meet the delay requirements for the largest value among the maximum allowable delay information for each of the plurality of the traffic flows, the maximum time slot allocation interval is set to the minimum common multiple of the per-traffic flow time slot allocation intervals.

Meanwhile, the resource allocator 410 determines the number of time slots included in the sensitive data transmission section.

For example, the number of time slots included in one sensitive data transmission section is set to the smallest integer equal to or larger than the average number of time slots allocated for N traffic flows in one time division scheduling unit format.

Specifically, the average number of time slots allocated for the N traffic flows in one time division scheduling unit format may be determined by Equation 9. Since the time slot allocation interval set to each traffic flow has been determined, the average number of time slots may be determined using the time slot allocation interval of each traffic flow and the number of traffic flows.

$$ATSTCD^k = \sum_{i=1}^{N}(TDI^k/TSAI_i) \quad \text{[Equation 9]}$$

Here, $ATSTCD^k$ means the average number of time slots allocated for the N traffic flows for one time division scheduling unit ($TDI^k$).

Since the number of time slots should be an integer, the resource allocator 410 determines the number of time slots as in Equation 10.

$$TSTCD^k = \lceil ATSTCD^k \rceil \quad (10)$$

Here, $TSTCD^k$ denotes the number of time slots included in one sensitive data transmission section.

The number of time slots and the length of the time slot have been calculated above. Accordingly, the length of the sensitive data transmission section may be calculated by multiplying the length of the time slot by the number of time slots. Further, the length of the second insensitive data transmission section is determined as the value obtained by subtracting the length of the first insensitive data transmission section, the length of the guard band section, and the length of the sensitive data transmission section from the length of the time division scheduling unit format.

As such, the resource allocator 410 may calculate the length of the individual sections constituting the time division scheduling unit format and the time slot allocation interval for each traffic flow, using the stream information.

In the individual sections of the time division scheduling unit format thusly determined, the first data and the second data are included in the corresponding sections and are transmitted. Further, the first data of each transmission entity is transmitted from the output port of the switch entity using a specific time slot in a specific time division scheduling unit format according to the set time slot allocation interval.

Accordingly, the resource allocator 410 should designate a time slot where the first data is to be transmitted, for each traffic flow.

Figure 7:
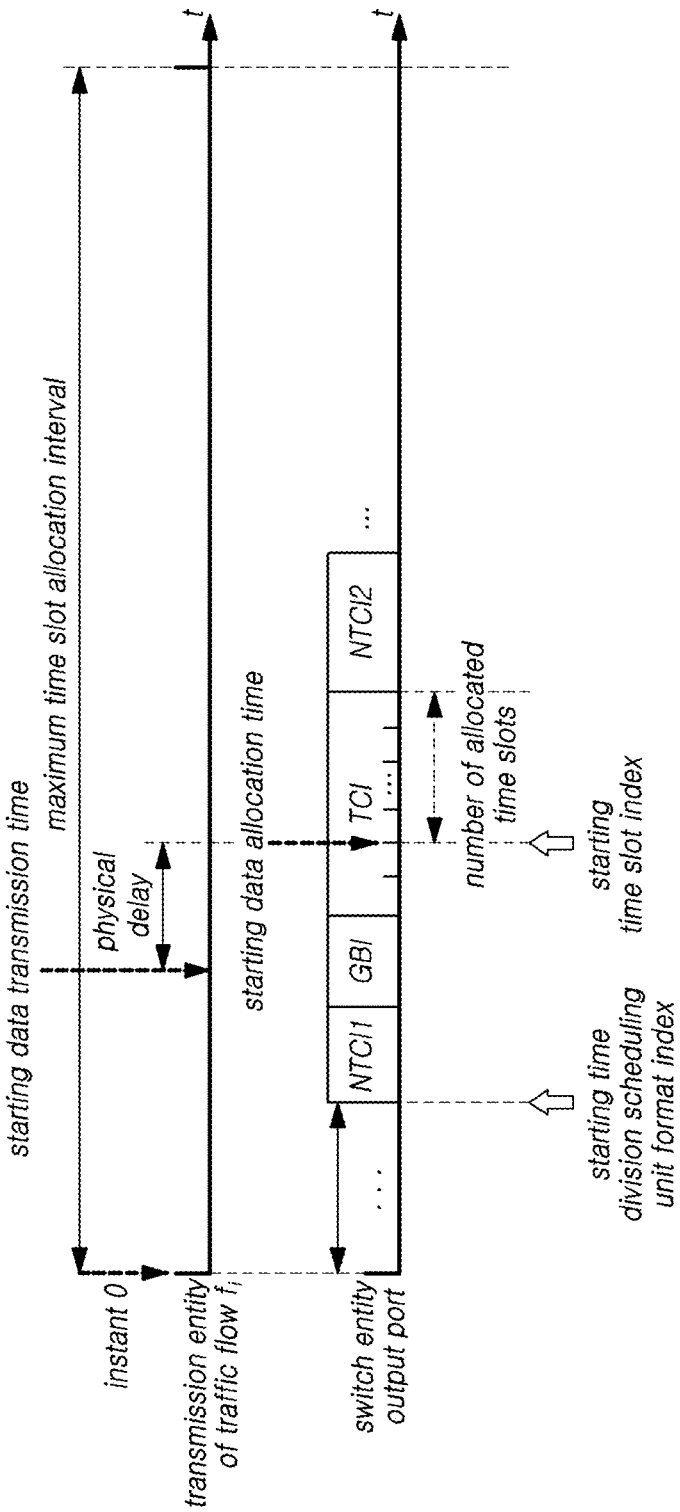
FIG. 7 is a view illustrating an operation of allocating data of a traffic flow to a time slot in a time slot allocation interval according to an embodiment.

FIG. 7 is a view illustrating an operation of allocating data of a traffic flow to a time slot in a time slot allocation interval according to an embodiment.

Referring to FIG. 7, the switch entity output port may allocate first data while repeating at the period of the maximum time slot allocation interval constituted with a plurality of time division scheduling unit formats. For example, the switch gate control list information and the transmission entity gate control list information are repeated at the hyper period set as the maximum time slot allocation interval.

The resource allocator 410 allocates the first data of a specific traffic flow to the output port of the switch entity. To that end, the resource allocator 410 may designate a time slot where the first data of the specific traffic flow is allocated through the starting time slot index and the starting time division scheduling unit format index.

For example, the hyper period which is the maximum time slot allocation interval includes a plurality of time division scheduling unit formats. Accordingly, to indicate the time slot allocated to the specific transmission entity, an index for indicating the time division scheduling unit format is required. Further, the sensitive data transmission section of the time division scheduling unit format includes a plurality of time slots and thus requires indexes indicating the time slots.

Specifically, the resource allocator 410 determines the starting time division scheduling unit format index and starting time slot index for each of the plurality of traffic flows in ascending order of maximum allowable delay information of the first data for each of the plurality of traffic flows. In other words, the resource allocator 410 sorts the plurality of traffic flows from the smallest maximum allowable delay information value to the largest and first allocates the time slot of the first data of the transmission entity having the smallest maximum allowable delay information.

For example, if there are traffic flow 1, traffic flow 2, and traffic flow 3, and the transmission entities are sorted in ascending order of maximum allowable delay information, the traffic flows may be sorted in the order of traffic flow 2, traffic flow 1, and traffic flow 3. The resource allocator 410 may first allocate the time slot of the first data transmitted by traffic flow 2 having the smallest maximum allowable delay information and then allocates time slots in the order of traffic flow 1 and traffic flow 3.

For example, it is assumed that the first data of traffic flow 2 is allocated to starting time slot index 0 of starting time division scheduling unit format index 0. The resource allocator 410 identifies whether there is a remaining time slot of time division scheduling unit format index 0 to next allocate the first data of traffic flow 1. If there is no remaining time slot in time division scheduling unit format index 0, the resource allocator 410 determines time slot index 0 of time division scheduling unit format index 1 as the starting time division scheduling unit format index and starting time slot index of traffic flow 1.

If the starting data allocation time is determined, time slot allocation is repeatedly performed in the hyper period according to the time slot allocation interval determined per traffic flow. In other words, if the starting time division scheduling unit format index and starting time slot index are determined per traffic flow, the resource allocator 410 allocates the time slot in the hyper period by applying the time slot allocation interval per traffic flow.

Meanwhile, since determination of the starting data allocation time has been set with respect to the output port of the switch entity, the physical layer delay value from the transmission entity of the corresponding traffic flow to the switch entity to be scheduled should be considered for the transmission entity to meet the starting data allocation time of the output port of the corresponding switch entity.

For example, the first data transmission time for each transmission entity transmitting each traffic flow is determined as a previous time obtained by applying the physical layer delay value from generation of the first data by the transmission entity to arrival at the queue of the output port of the switch scheduled in the corresponding sub network to the time determined as the starting time division scheduling unit format index and the starting time slot index.

As described above, the resource allocator 410 allocates the first data transmission time per traffic flow in each section of the set time division scheduling unit format.

The central network configurator 100 may include a gate control list generator 420 that generates at least one of switch gate control list information for controlling the operation of the switch entity and transmission entity gate control list information for controlling the data transmission gates of a plurality of transmission entities, based on the stream information and the output port time resource.

For example, the gate control list generator 420 determines the open/close operation of the switch entity and each transmission entity using, e.g., the time slot allocation information about each traffic flow determined by the resource allocator 410 and first data transmission time information about each traffic flow according to time slot allocation.

Meanwhile, the gate control list generator 420 sets the length of the switch gate control list information and transmission entity gate control list information to be equal to the maximum time slot allocation interval. In other words, the gate operation of each queue for transmission of the first data and second data for the entire maximum time slot allocation interval which is the hyper period is generated as gate control list information.

The central network configurator 100 may include a transmitter 430 that transmits the switch gate control list information to the switch and transmits the transmission entity gate control list information to the central user configurator. The central user configurator transmits the transmission entity gate control list information to the transmission entity so that the transmission entity controls the gate operation using the information.

Meanwhile, the above-described operations may be performed per sub network. In other words, to control the operation of the switch entity for a specific traffic flow, the above-described operations may be performed per sub network transferring the corresponding traffic flow. Further, switch gate control list information may be generated through the above-described operations per switch entity in the sub network.

Figure 8:
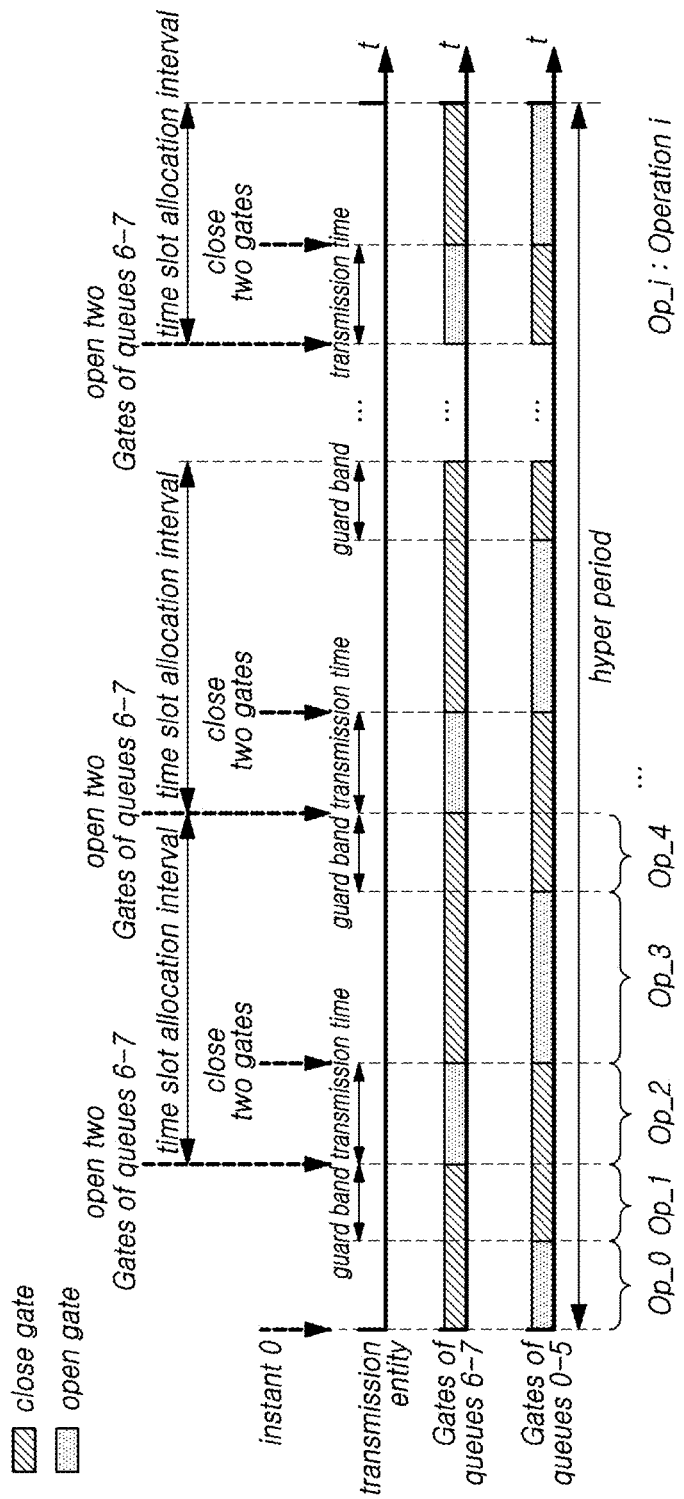
FIG. 8 is a view illustrating an example of a gate state of a transmission entity in a hyper period according to an embodiment.

FIG. 8 is a view illustrating an example of a gate state of a transmission entity in a hyper period according to an embodiment.

Referring to FIG. 8, the transmission entity of a specific traffic flow controls the gate open/close operation of queues 0-5 transmitting the second data and queues 6-7 transmitting the first data according to the received gate control list information about the transmission entity. In the guard band section, the gates of all the queues are closed, and only one of the two gates of queues 0-5 and queues 6-7 is set to be open. Each gate operation is set to operation i and is included in the transmission entity gate control list information in chronological order.

In particular, the gate operation of the transmission entity is determined considering the physical layer delay as shown in FIG. 8 and, considering the guard band section, is allocated so that the first data and the second data do not overlap each other. Also set is a transmission time reflecting the gate open period for transmission of the first data according to the time slot allocation interval and reflecting the number of time slot allocations of the switch entity.

Accordingly, if the transmission entity sequentially performs the gate open/close operations according to the transmission entity gate control list information and maintains the gate open duration for first data transmission, the first data is allocated to the time slot for the corresponding transmission entity set in the time division scheduling unit format of the switch entity and is transferred to the reception entity within the required delay.

In other words, the central network configurator 100 may collect the stream information about all traffic flows in the network, determine the time division scheduling unit format and time slot allocation of the switch entity, and accordingly control the gate operation of the transmission entity transmitting each traffic flow so that the first data of all the traffic flows may be transferred to the reception entity within the required delay.

Figure 9:
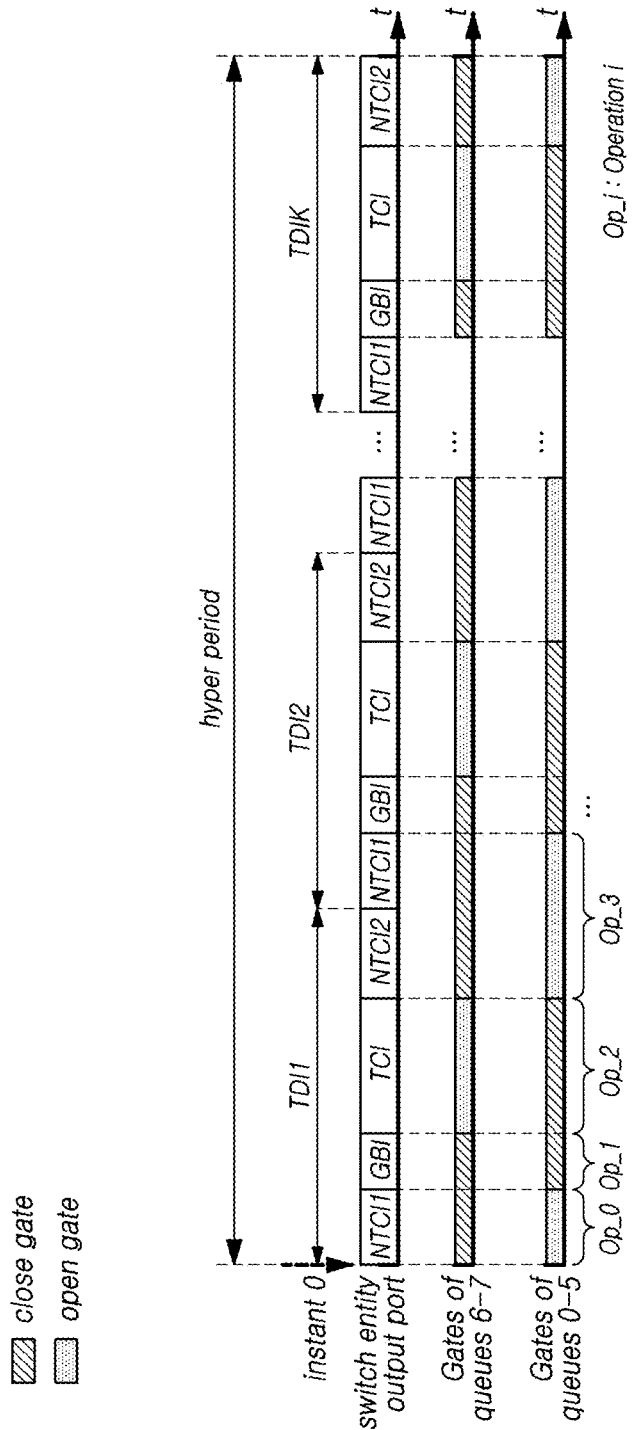
FIG. 9 is a view illustrating an example of an output port gate state of a switch entity in a hyper period according to an embodiment.

FIG. 9 is a view illustrating an example of an output port gate state of a switch entity in a hyper period according to an embodiment.

Referring to FIG. 9, the first data and the second data may be transmitted from a specific switch entity output port in the sub network through the time division scheduling unit format and time slot allocation set by the central network configurator 100. The gate operation therefor is sequentially set in the entire hyper period through the switch gate control list information.

In other words, the gate open/close operation of the switch entity is performed according to time as shown in FIG. 9, by the switch gate control list of Table 1.

TABLE 1

| gateOperationName | gateStates | timeInterval |
|---|---|---|
| Operation 0 | 0011 1111 | $NTCI_1^k$ |
| Repeat ($NTDI^k$ − 1) times: Operation 1 | 0000 0000 | $GBI^k$ |
| Operation 2 | 1100 0000 | $TCI^k$ |

TABLE 1-continued

| gateOperationName | gateStates | timeInterval |
|---|---|---|
| Operation 3 | 0011 1111 | $NTCI_2^k + NTCI_1^k$ |
| ... | ... | ... |
| Operation [3 × ($NTDI^k$ − 1) + 1] | 0000 0000 | $GBI^k$ |
| Operation [3 × ($NTDI^k$ − 1) + 2] | 1100 0000 | $TCI^k$ |
| Operation [3 × ($NTDI^k$ − 1) + 3] | 0011 1111 | $NTCI_2^k$ |

Figure 10:
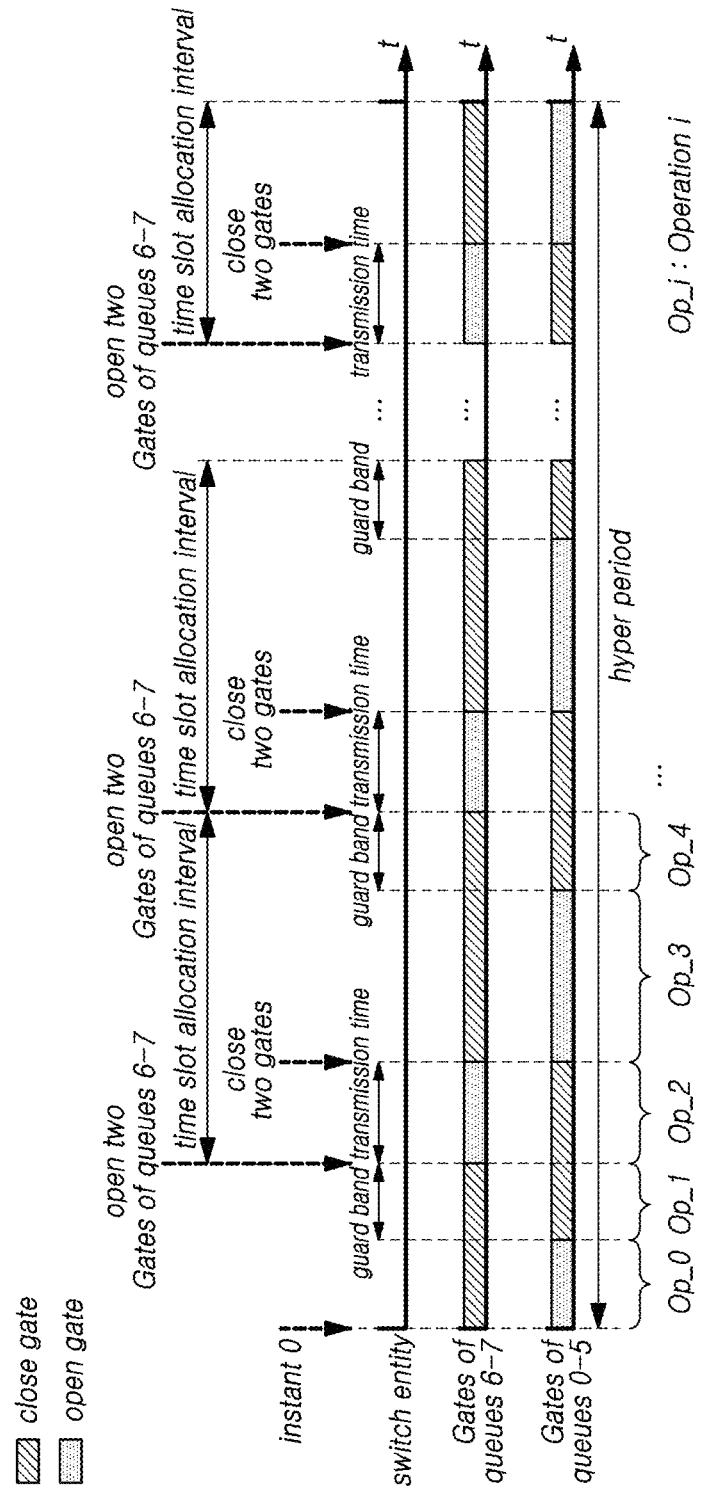
FIG. 10 is a view illustrating an example of a gate state of a switch entity associated with a reception entity in a hyper period according to an embodiment.

FIG. 10 is a view illustrating an example of a gate state of a switch entity associated with a reception entity in a hyper period according to an embodiment.

Referring to FIG. 10, the switch entity of the sub network connected with the reception entity may also control the gate operation for transmission of the first data and second data according to the gate control list information. In this case, the length of each gate open time period of the gate control list information of the switch entity of the sub network connected with the reception entity is equal to the length of each gate open time period of the transmission entity. This is why the frame length of the first data transmitted by a specific transmission entity is equal to the frame length of the first data received.

However, the operation time of the switch entity of the sub network connected to the reception entity is determined, with the first data in conjunction with the gate operation of the switches included in one or more sub networks and the transmission entity.

An experimental result obtained when applying the present embodiments is described below.

Table 2 shows an example of network parameters in the time-sensitive network. The same network parameters were applied to compare the conventional traffic control system and the traffic control system to which the disclosure has been applied.

TABLE 2

| Parameter | Value |
|---|---|
| The length of the inter frame gap ($L_{ifg}$) | 12 bytes |
| The network link speed ($NL_{spd}$) | 1 Gbps |
| The processing delay of a switch ($d_{proc}$) | 8 us |
| The length of a physical link ($L_{link}$) | 100 m |
| The propagation speed of the electrical signal in a physical link ($ES_{prop}$) | $2 \times 10^8$ m/s |
| The propagation delay in a physical link ($d_{prop} = L_{link}/ES_{prop}$) | 0.5 us |

Figure 11:
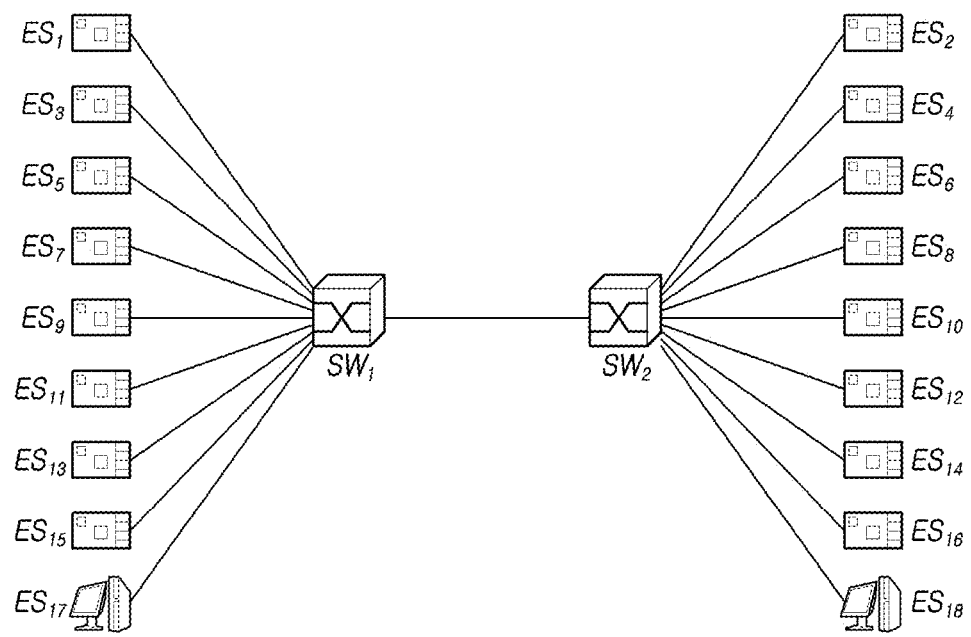
FIG. 11 is a view illustrating an example of a time-sensitive network configured as a single sub network according to an embodiment.

FIG. 11 is a view illustrating an example of a time-sensitive network configured as a single sub network according to an embodiment.

Referring to FIG. 11, the time-sensitive network is constituted of a single sub network including two switch entities. Each switch entity is connected to a transmission entity or a reception entity to form a link. Switch entity 1 is connected with nine transmission entities, one of which is an entity transmitting time-insensitive data, and the other eight are entities transmitting time-sensitive data. Switch entity 2 is connected with nine reception entities, one of which is an entity receiving time-insensitive data, and the other eight are entities receiving time-sensitive data. Each traffic flow is formed from $ES_i$ to $ES_{i+1}$.

If the respective maximum allowed required delays of the traffic flows are set to 100 us, 100 us, 200 us, 200 us, 400 us, 400 us, 800 us, and 800 us, respectively, and the frame length of the time-sensitive data is set to 1,530 bytes, the parameters for generating gate control list information through the above-described operations are obtained per traffic flow as shown in Table 3.

TABLE 3

| flow | TSN_f$_1$ | TSN_f$_2$ | TSN_f$_3$ | TSN_f$_4$ | TSN_f$_5$ | TSN_f$_6$ | TSN_f$_7$ | TSN_f$_8$ |
|---|---|---|---|---|---|---|---|---|
| k$_i$ | 1 | 1 | 2 | 2 | 4 | 4 | 8 | 8 |
| TSAI$_i$ | 100 | 100 | 200 | 200 | 400 | 400 | 800 | 800 |
| STDIN$_i$ | 1 | 1 | 1 | 1 | 2 | 2 | 4 | 4 |
| SSN$_i$ | 1 | 2 | 3 | 4 | 3 | 4 | 3 | 4 |
| FMTI$_i^{SW1}$ | 20.74 | 33.076 | 45.412 | 57.748 | 145.412 | 157.748 | 345.412 | 357.748 |
| FMTI$_i^{talker}$ | 0 | 12.336 | 24.672 | 37.008 | 124.672 | 137.008 | 324.672 | 337.008 |

Here, TSAI is the time slot allocation interval, and STDIN is the starting time division scheduling unit index. SSN means the starting time slot index. FMTI$_i^{SW1}$ means the first data transmission time in switch entity 1, and FMTI$_i^{talker}$ means the first data transmission time in the transmission entity.

When the method according to the disclosure is applied, the length of the time division scheduling unit format is determined to be 100 us, and the length of the guard band section is determined to be 12.24 us. Further, the length of the first insensitive data transmission section is set to 8.5 us, and the length of the time slot is set to 12.336 us. The minimum time slot allocation interval is set to 100 us, and the maximum time slot allocation interval, i.e., 800 us, is set as the hyper period. Further, the number of time slots included in one sensitive data transmission section is determined to be four.

Accordingly, the length of the sensitive data transmission section is set to 49.344 us, and the length of the second insensitive data transmission section is set to 29.916 us.

Further, the starting time division scheduling unit index and the starting time slot index may be calculated as shown in Table 3 above. Thus, the first data transmission time from the transmission entity is calculated as shown in Table 3 above, and the first gate open time is accordingly determined equally.

The length of the transmission entity gate control list is determined to be equal to the maximum time slot allocation interval, i.e., 800 us.

FIG. 12 is a view illustrating an example of transmission entity gate control list information according to an embodiment. FIG. 13 is a view illustrating an example of switch gate control list information according to an embodiment.

Referring to FIG. 12, the gate control list information about transmission entity 1 to which the above example has been applied may be generated as shown in FIG. 12. Transmission entity 1 performs the gate open/close operation according to the gate operation of FIG. 12, and the starting period of each operation is maintained for a set time.

Similarly, the switch gate control list information about the switch entity is calculated as shown in FIG. 13.

Figure 14:
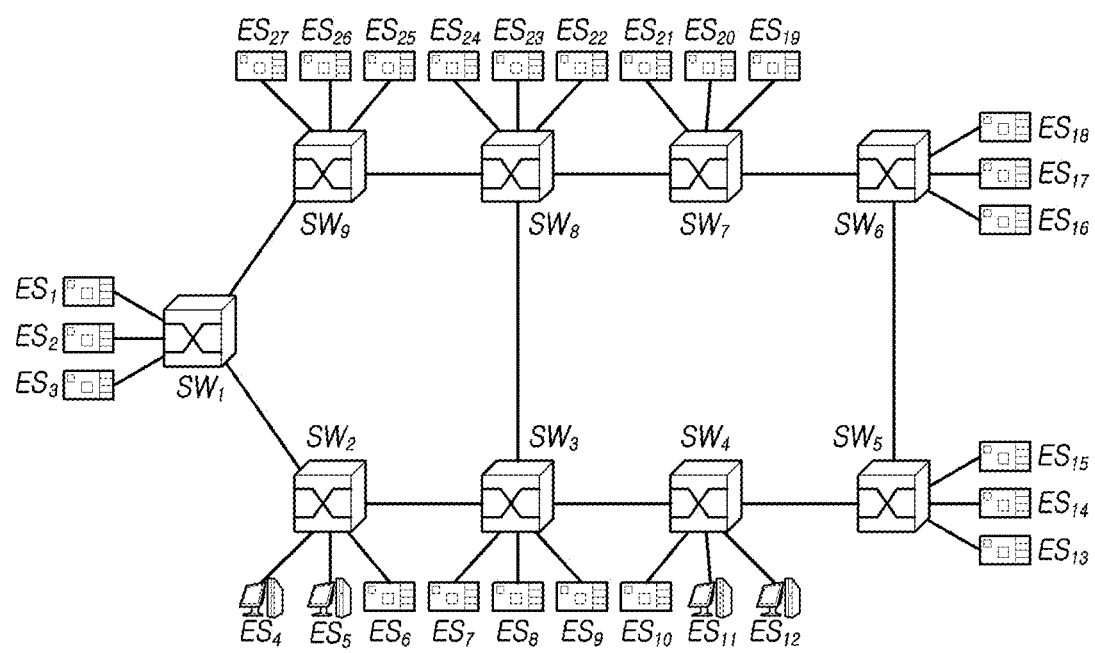
FIG. 14 is a view illustrating an example of a time-sensitive network including multiple sub networks according to an embodiment.

FIG. 14 is a view illustrating an example of a time-sensitive network including multiple sub networks according to an embodiment.

Referring to FIG. 14, the time-sensitive network may include 27 end stations and nine switch entities. It is assumed that in the time-sensitive network, 34 time-sensitive traffic flows (TCs) and two time-insensitive traffic flows (NTCs) are configured as shown in Table 4.

TABLE 4

| Flow | Type | Talker | Listener | Period P$_i$ | φ$_i$ | Size |
|---|---|---|---|---|---|---|
| f$_1$, f$_2$ | TC | ES2 | ES14 | 800 us | 800 us | MTU |
| f$_3$, f$_4$ | TC | ES3 | ES7 | 400 us | 400 us | MTU |

TABLE 4-continued

| Flow | Type | Talker | Listener | Period P$_i$ | φ$_i$ | Size |
|---|---|---|---|---|---|---|
| f$_5$, f$_6$ | TC | ES9 | ES14 | 200 us | 200 us | MTU |
| f$_7$-f$_{10}$ | TC | ES9 | ES13 | 400 us | 400 us | MTU |
| f$_{11}$-f$_{18}$ | TC | ES8 | ES14 | 800 us | 800 us | MTU |
| f$_{19}$ | TC | ES1 | ES27 | 300 us | 300 us | MTU |
| f$_{20}$ | TC | ES26 | ES20 | 300 us | 300 us | MTU |
| f$_{21}$, f$_{22}$ | TC | ES24 | ES21 | 150 us | 150 us | MTU |
| f$_{23}$-f$_{27}$ | TC | ES23 | ES21 | 300 us | 300 us | MTU |
| f$_{28}$-f$_{32}$ | TC | ES22 | ES21 | 600 us | 600 us | MTU |
| f$_{33}$ | TC | ES19 | ES15 | 300 us | 300 us | MTU |
| f$_{34}$ | TC | ES7 | ES23 | 300 us | 300 us | MTU |
| f$_{35}$ | NTC | ES4 | ES11 | sporadic | — | MTU |
| f$_{36}$ | NTC | ES5 | ES12 | sporadic | — | MTU |

The network parameters are the same as those in Table 2. In the time-sensitive network of FIG. 14, seven sub networks are configured as shown in FIG. 2.

If the above-described operations of the disclosure are applied, gate control list information from the output port of switch entity 4 is produced as shown in FIG. 15.

By the above-described operations, the central network configurator may control the traffic of the entire network to allow the time-sensitive data to arrive at the reception entity within the maximum allowable delay by efficiently controlling the gate operations of the transmission entity and the switch entity.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," "entity," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

The invention claimed is:

1. A central network configurator controlling data traffic scheduling of a time-sensitive network, comprising,
    a receiver receiving, from a central user configurator, stream information about a plurality of traffic flows transmitting first data sensitive to time delay in a sub network and second data insensitive to the time delay;
    a resource allocator allocating an output port time resource of each switch entity of a plurality of switch entities included in the sub network transferring the first data and the second data using the stream information;
    a gate control list generator generating at least one of switch gate control list information for controlling an operation of each switch entity of the plurality of switch entities and transmission entity gate control list information for controlling a data transmission gate of a plurality of transmission entities transmitting the plurality of traffic flows, based on the stream information and the output port time resource; and
    a transmitter transmitting the switch gate control list information to each switch entity of the plurality of switch entities and transmitting the transmission entity gate control list information to the central user configurator.

2. The central network configurator of claim 1 which further comprises a plurality of subnetworks,
    wherein the traffic flow is transferred from a transmission entity to a reception entity through one or more-sub networks, and
    wherein each of the sub networks includes two or more switch entities.

3. The central network configurator of claim 1, wherein the stream information includes information about a number of the plurality of traffic flows, maximum allowable delay information about the first data per traffic flow, and data frame length information about the first data.

4. The central network configurator of claim 1, wherein the resource allocator determines a time division scheduling unit format used for a switch entity of the plurality of switch entities to transfer the first data and the second data to another switch entity of the plurality of switch entities, and
    wherein the time division scheduling unit format includes a sensitive data transmission section for transmitting the first data, a first insensitive data transmission section for transmitting the second data, a second insensitive data transmission section, and a guard band section,
    wherein the output port time resource to transfer the first date and the second data through the time division scheduling unit format.

5. The central network configurator of claim 4, wherein a length of the time division scheduling unit format is set to not more than a smallest value of maximum allowable delay information about the first data per traffic flow included in the stream information,
    wherein a sum of the first insensitive data transmission section and the guard band section is set to be equal to a physical layer delay value from generation of the first data from a transmission entity transmitting the traffic flow to arrival at a queue of an output port of each switch entity of the plurality of switch entities, and
    wherein a length of the guard band section is set to a value obtained by dividing a data frame length of the first data included in the stream information by a network link speed.

6. The central network configurator of claim 4, wherein the sensitive data transmission section includes a plurality of time slots, and
    wherein the resource allocator determines a number of the time slots and a time slot allocation interval per traffic flow.

7. The central network configurator of claim 6, wherein a minimum time slot allocation interval of the time slot allocation interval is set to be equal to a smallest value of maximum allowable delay information about the first data per traffic flow, and
    wherein a maximum time slot allocation interval is set to a least common multiple of respective time slot allocation intervals of the traffic flows.

8. The central network configurator of claim 7, wherein the switch gate control list information and the transmission entity gate control list information are repeated at a hyper period set as the maximum time slot allocation interval.

9. The central network configurator of claim 6, wherein a length of the time slot is set to a value obtained by dividing a sum of a data frame length of the first data included in the stream information and an interval between two frames by network link speed information, and
    wherein a number of the time slots included in one sensitive data transmission section is set to a smallest integer equal to or larger than an average number of time slots allocated for N traffic flows in one time division scheduling unit format.

10. The central network configurator of claim 6, wherein the resource allocator determines a starting time division scheduling unit format index and a starting time slot index for each of the plurality of traffic flows in ascending order of maximum allowable delay information about the first data for each of the plurality of traffic flows.

11. The central network configurator of claim 10, wherein in response to if the starting time division scheduling unit format index and the starting time slot index per traffic flow are determined, the resource allocator allocates the time slot by applying the time slot allocation interval per traffic flow.

12. The central network configurator of claim 10, wherein the first data transmission time of the transmission entity per traffic flow is determined as a previous time obtained by applying a physical layer delay value from generation of the first data from the transmission entity to arrival at a queue of the output port of each switch entity of the plurality of switch entities to a time determined with the starting time division scheduling unit format index and the starting time slot index.

13. The central network configurator of claim 1, wherein the gate control list generator sets a length of the switch gate control list information and the transmission entity gate control list information to be equal to a maximum time slot allocation interval.

14. A time-sensitive network control system, comprising:
- a plurality of transmission entities generating and transmitting first data sensitive to time delay and second data insensitive to the time delay;
- a plurality of reception entities receiving the first data and the second data;
- a plurality of switch entities for transferring the first data and the second data to a reception entity;
- a central user configurator receiving stream information about a plurality of traffic flows from a transmission entity and a reception entity, transferring the stream information to a central network configurator, and transferring transmission entity gate control list information to a transmission entity; and
- the central network configurator allocating an output port time resource of each switch entity of the plurality of switch entities based on the stream information and generating at least one of switch gate control list information for controlling an operation of a switch entity and transmission entity gate control list information for controlling a data transmission gate of a transmission entity transmitting the plurality of traffic flows.

15. The time-sensitive network control system of claim 14, wherein the stream information includes information about a number of the plurality of traffic flows, maximum allowable delay information about the first data per traffic flow, and data frame length information about the first data.

16. The time-sensitive network control system of claim 14, wherein the central network configurator,
- determines a time division scheduling unit format used for a switch entity to transfer the first data and the second data to another switch entity and
- determines a starting time division scheduling unit format index and a starting time slot index of the first data for each of the plurality of traffic flows, allocated to a plurality of time slots constituting the time division scheduling unit format.

\* \* \* \* \*